United States Patent

[11] 3,542,393

[72] Inventor Sam C. Verdi
 15444 Blue Skies Ave., Livonia, Michigan 48154
[21] Appl. No. 724,782
[22] Filed April 29, 1968
[45] Patented Nov. 24, 1970

[54] SUSPENSION
 15 Claims, 4 Drawing Figs.
[52] U.S. Cl. .................................................... 280/104.5, 180/22
[51] Int. Cl. .................................................... B60g 5/06
[50] Field of Search .......................................... 280/104.5, 104.5A, 104.5B, 124F; 180/22E, 22F

[56] References Cited
UNITED STATES PATENTS
3,096,995 7/1963 Richnow .................. 180/22D
2,842,326 7/1958 Sharples ................... 280/104.5X Primary Examiner—Philip Goodman
Attorney—David A. Maxon ABSTRACT: This invention relates to suspensions for motor vehicles and trailers. It provides for a pair of beams suspended from a common central pivot cylinder of trunnion tube. Each of a pair of axles in tandem array are fixed to an opposite end of one of the respective beams. Air bags are provided between these ends of the beams and frame of the vehicle. Flanges are provided underneath the beams near the trunnion tube. These flanges limit the downward translation of the beam to a horizontal level position. Each of these flanges also act as a lever on the other beam to lift the other beam when air pressure on an air bag is lowered.

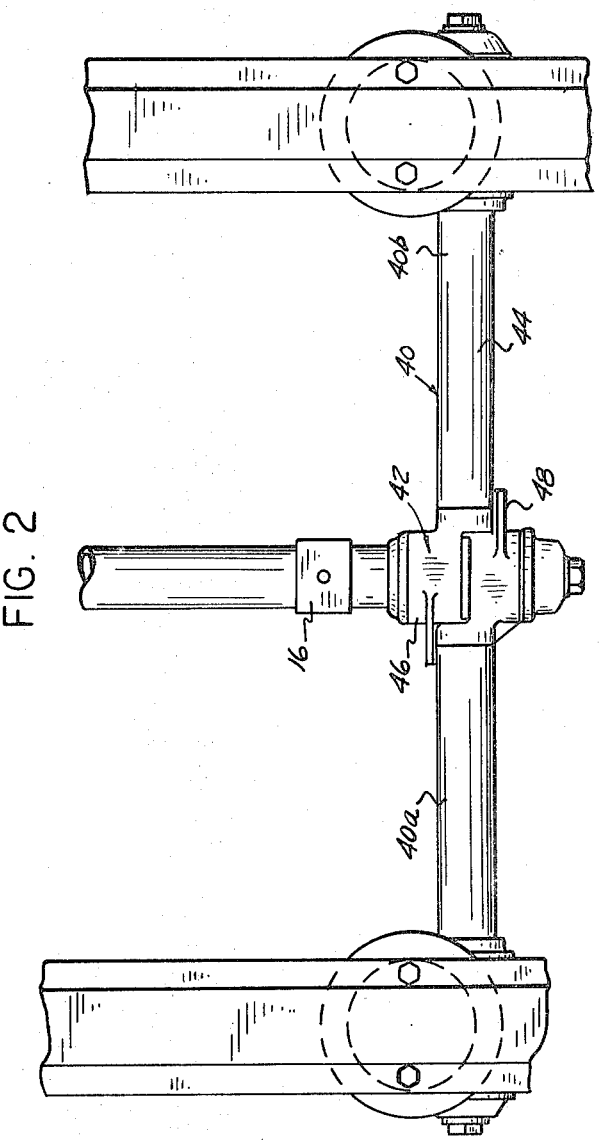
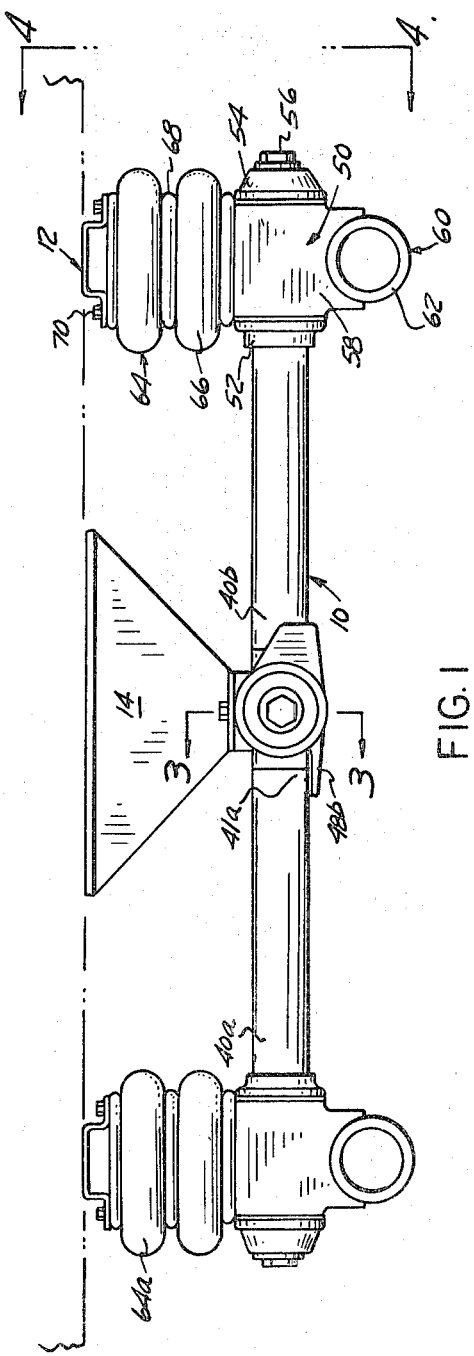
INVENTOR
SAM C. VERDI
BY David A. Mason
ATTORNEY

SUSPENSION

This invention relates generally to suspensions for motor vehicles and trailers. More specifically this invention relates to a suspension for tandem axles, providing air bags near the axles and connecting to the frame of the vehicle, each of a pair of beams carrying one of the axles, and journaled on a common central trunnion tube.

In the art of designing suspensions for motor vehicles, particularly for trailers drawn by a tractor, it is a common practice to provide means of lifting the axle from a road-engaging or load carrying position. This feature is useful for traversing corners or curves with a reserve capacity for later lowering the axle when entering a jurisdiction requiring more axles for a given load. In providing for this feature in the past, it has been necessary to provide not only resilient means for suspension purposes when the raisable axle is down, but in addition, other structure has to be provided in order to selectively raise and lower the axle. This other structure includes additional resilient means and often complicated mechanical linkages and levers as well. This extra structure is often complicated to manufacture, difficult to service, increases the initial cost of the vehicle, and by its added weight, decreases the pay load in operation.

Accordingly, it is an object of my invention to provide a suspension for motor vehicles having tandem axles with means for selectively raising and lowering one of these axles from a load carrying road engaging position to a raised position without requiring resilient members that cannot be used to carry structural load on the suspension at all times during the operation of the vehicle.

It is another object of my invention to provide a suspension for tandem axles of a motor vehicle with inexpensive efficient, and uncomplicated means for raising and lowering one of the axles from a ground engaging load carrying position to a raised position.

It is a further object of my invention to provide a suspension for tandem axles of a motor vehicle with means of reduced weight for raising and lowering one of the axles from a ground engaging position to a raised position.

It is another object of this invention to provide a suspension for tandem axles on a motor vehicle with means for selectively raising or lowering one of the axles from a ground engaging load carrying position to a raised position by simply changing air bag pressures used to resiliently carry structural load on the suspension without reliance on additional resilient or springlike members.

It is a further object of this invention to provide a suspension for tandem axles of a motor vehicle with a cooperation between air bags and leverlike beams connected to the axles for carrying the load and providing means to align the axles when a substantial portion of the load is carried by the air bags.

These and other objects of this invention are accomplished by providing a suspension with a split beam configuration. This configuration comprises a pair of beams journaled on a common trunnion tube. Axles are attached to each of these beams at their opposite ends. Air bags are provided between these ends of these beams and the frame of the vehicle. Flanges are provided on the beams for limiting the forward rotation of one of the beams to a horizontal level position and for providing a lever for raising one of the beams to a position whereby the axle to which it is attached is raised so that the wheels thereon are removed from a road engaging or load carrying position. Means are provided for selectively energizing or deenergizing the air bags to initiate the raising and lowering of an axle. During travel of the vehicle, these air bags can be energized to a predetermined pressure for resiliently carrying the structural load on the suspension. The beams are used not only for raising and lowering the axles, but in addition, are used as a lever in transmitting the structural load on the suspension to the axles.

Other objects of this invention will appear on the following description and dependent claims, referring to the accompanying drawings forming a part of this specification.

ON THE DRAWINGS

FIG. 1 is a side view of a portion of the preferred embodiment of this invention;

FIG. 2 is a top view of the apparatus shown in FIG. 1;

Figure 3:
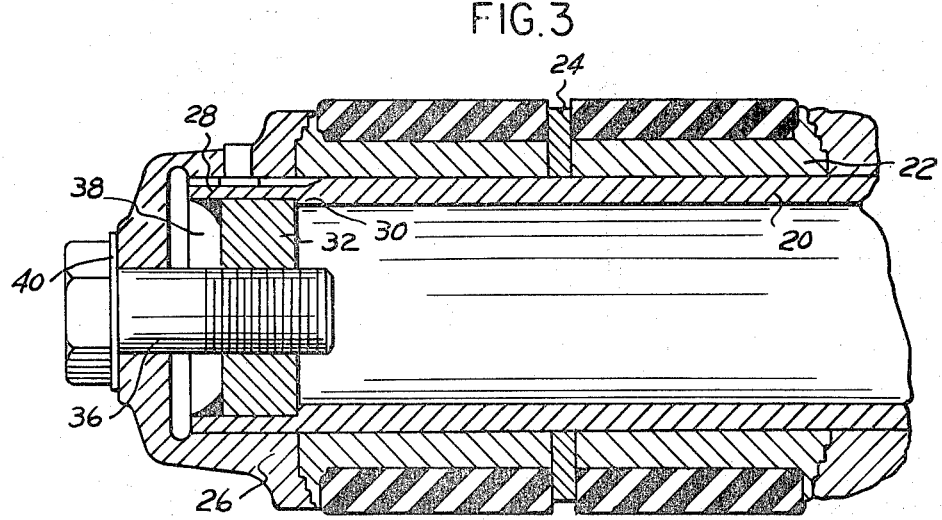
FIG. 3 is a partial cross-sectional view of the apparatus shown in FIG. 1 taken along section lines 3—3.
Figure 4:
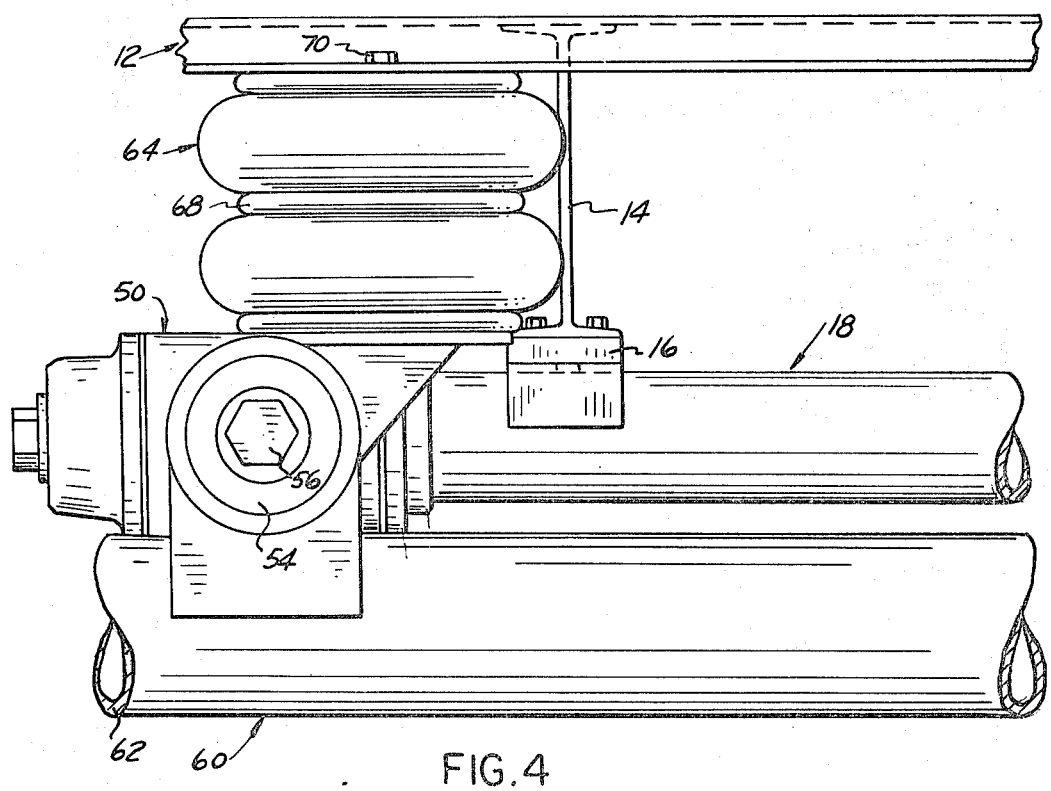

And FIG. 4 is a partial transverse-sectional view of the apparatus shown in FIG. 1 taken along with section lines 4—4.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also it is to be understood that the phraseology and terminology employed herein is for the purpose of description and not of limitation.

AS SHOWN ON THE DRAWINGS

The preferred embodiment of this invention comprises a suspension designated by a numeral 10. A frame of the vehicle to which the suspension is attached is shown at numeral 12.

A bracket 14 is rigidly attached to the frame 12. In its preferred embodiment, the bracket 14 is an I-beam. A bracket portion 16 is rigidly secured to the bracket 14 preferably by means of bolts 19. A cylindrical member or trunnion tube member 18 is rigidly secured to the bracket portion 16 preferably by welding.

The trunnion tube member 18 extends across the bottom of the vehicle underneath its frame. It comprises a right circular cylindrical hollow tube 20 made of steel. Rubber bushings 22 are provided on the outboard ends of this tube. The rubber of bushings 22 is preferably a silicone compound for low friction and good wearing properties. The rubber bushings 22 are arranged in corresponding pairs separated by a metal ring or washer 24. The rubber bushings 22 are contained on the end of the trunnion tube by means of a metal cap 26.

The interior of the tube 20 at its ends has a greater diameter than the balance of the trunnion tube. This results in an annular depression portion 28 at the very end of the trunnion tube that extends from the very end of the tube to an abutting ledge portion 30. A nut 32 fits in this annular depression and abuts against the ledge portion 30. A bolt 36 is secured by the nut 32 and washers 38 and 40. In this manner, the cap 26 is secured to the trunnion tube 20 and holds the bushings 22 and divider ring thereon.

A pair of beam members 40a and 40b are commonly journaled on the trunnion tube at the rubber bushings 22. The common journaling is at the end portions 42 of the beams 40. The beam portions 40 comprise a right circular cylindrical tube portion 44 having a central axis perpendicular to the central axis of the trunnion tube 20. The end portions 42 comprise a right circular cylindrical sleeve member 46 that has a central axis coincident with the central axis of the trunnion tube 20. These sleeves are set off from the tube portions 44 of the beam members in such a manner as to be symmetrically disposed with respect to each other about the central axes of the beam tube portions 44. Flange portions 48 are rigidly secured to the sleeve portions 46. These flange portions 48 wrap around but are set at a distance from the tube portions 44. The wrap around configuration comprises approximately 90 degrees of arc about the tube portion 44. A flange portion 48 of one beam member 40 extends from the side to below the tube portion 44 of a beam member 40.

OPERATION

FIG. 1 shows both of the beam members 40 in a horizontal level position when both axles are in a ground engaging load carrying normal position. In this position of the apparatus, the air bags 64 are inflated to a preselected pressure corresponding to load characteristics desired for a given structural load on the suspension.

The desired pressure can be monitored and selected from the cab of the motor vehicle by a gauge therein responsive to the air pressure in the air bags and a valve control therein controlling valves supplying and venting air to the air bags. When it is desired to raise one of the axles, the air bag adjacent to that axle is reduced in air pressure or deenergized. The forces on the beam members 40 then exert a resultant moment on the beams 40 in such a manner that the lower part of the flange portion 48 coacts with that one of the beam portions 40 connected to the deenergized bag to lever that beam portion into rotation about the trunnion tube. This raises the axle. More particularly, where air bag 64a is deenergized, the air from this bag is vented by a leveling valve (not shown) responsive to movement between the axle 60 and the frame of the vehicle, while maintaining air pressure and in the other of the air bags that is not deenergized. The lower beam portion 41a of beam member 40a cams against the top surface of flange 48b of beam member 40b. This results in a clockwise rotation of beam member 40a about the center of the trunnion tube 20.

When it is desired to lower the raised axle back into a ground-engaging load carrying position, the air bag associated with the axle that was raised is energized. This forces the corresponding beam member to cam against the flange portion of the opposite beam member as the first mentioned beam member is lowered into a substantially horizontal position bringing the axle into ground engagement.

It can be appreciated from the foregoing description that a new and useful improvement in suspensions for motor vehicles has been provided wherein axles in the tandem array can be selectively raised from and lowered into a ground engaging load carrying position by corresponding deenergization and energization of the air bag that is also the structure for resiliently carrying structural load imposed upon the suspension. This results in suspension apparatus that is uncomplicated, inexpensive, easy to service, and light in weight.

I claim:

1. In a suspension for motor vehicles having tandem axles, the improvements comprising;
   a pair of means resiliently transmitting structural load on said suspension to said axles;
   said pair of transmitting means being rigidly secured to the frame of said vehicle;
   a journaling member rigidly secured to the frame of said vehicle;
   a pair of beam members;
   (a first beam member) each one of said beam members journaled on said journaling means and secured to a different one of said load transmitting means;
   (said beam member) each one of said beam members being attached to a different one of the tandem axles;
   a cam member attached to one of said beam members; and
   said cam member cooperating with the other of said beam members to selectively raise and lower one of the axles responsive to deenergization and energization of one of said load transmitting means.

2. The apparatus of claim 1 wherein said journaling member comprises a trunnion tube member rigidly secured to the frame of the vehicle and having a central geometric axis parallel to the axes of said tandem axles.

3. The apparatus of claim 1 wherein said cam member comprises a flange portion extending underneath said other beam member.

4. The apparatus of claim 1 and means for selectively energizing and deenergizing each of said pair of load transmitting means.

5. The apparatus of claim 1 wherein said one of said load transmitting means comprises an air bag.

6. The apparatus of claim 1 wherein each of said pair of load transmitting means comprises an air bag.

7. The apparatus of claim 1 wherein said journaling member comprises a trunnion tube member rigidly secured to the frame of the vehicle and having a central geometric axis parallel to the axes of said tandem axles; and said trunnion tube member comprises a hollow tube of steel and a rubber bushing concentrically mounted thereon and bearing against said beam members.

8. The apparatus of claim 1 and a second cam member attached to said other beam member;
   each of said cam members having a flange that extends underneath the beam member to which the other of said cam members is attached;
   whereby either one of said axles can be raised or lowered from an axle attached wheel road-engaging load carrying position to a raised position wherein said one axle is not in a road-engaging load carrying position.

9. The apparatus in claim 1 wherein said journaling member comprises a trunnion tube member rigidly secured to the frame of the vehicle and having a central geometric axis parallel to the axes of said tandem axles; and a rubber bushing attached on and concentric with said trunnion tube member and being interposed between said beam members.

10. The apparatus of claim 1 wherein said journaling member comprises a trunnion tube member rigidly secured to the frame of the vehicle and having a central geometric axis parallel to the axes of said tandem axles; and a ring member concentrically secured on said trunnion tube member separating said beam members and bearing against them.

11. The apparatus of claim 1 and means for selectively energizing and deenergizing each of said pair of load transmitting means; and means provided in the cab of the vehicle for monitoring and controlling said selective energization means.

12. The apparatus of claim 1 and means for selectively energizing and deenergizing each of said pair of load transmitting means;
   one of said load transmitting means comprising an air bag cooperating with said cam means and said one of said beam members; and
   whereby other beam member can be selectively raised from and lowered into a position in which the axle to which it is attached is in an axle attached wheel ground engaging position responsive to deenergization and energization of said air bag.

13. The apparatus of claim 1 and means for selectively energizing and deenergizing each of said pair of load transmitting means;
   one of said load transmitting means comprising an air bag;
   said cam member comprising a flange portion extending underneath said other beam member; and
   means securing said flange on said one beam member in a position with respect to said other beam member in such a manner as to limit the rotation of said other beam member about said journaling means from traversing past a horizontal position to a lower position.

14. The apparatus of claim 1 and means for selectively energizing and deenergizing each of said pair of load transmitting means;
   each one of said pair of load transmitting means comprising an air bag;
   said cam member comprising a flange portion extending underneath said other beam member; and
   means holding said flange member on said one beam member in a position with respect to said other beam member in such a manner that said flange member coacts with a deenergized air bag attached to said other beam member and simultaneous energization of an air bag attached to said one beam member to raise said other beam member in rotation about said journaling member.

15. The apparatus of claim 1 and means for selectively energizing and deenergizing each of said pair of load-transmitting means;
   each of said pair of load-transmitting means comprising an air bag;
   said cam member comprising a flange portion extending underneath said other beam member;
   a second cam member comprising a flange portion on said other beam member extending underneath said one beam member; and wherein the composite structure of one of said beam members, the air bag mounted thereon, and the cam flange portion thereon is a mirror image of a composite structure of the corresponding parts mounted on and integral with the other of said beam members.